United States Patent
Yin et al.

(10) Patent No.: US 9,578,297 B2
(45) Date of Patent: Feb. 21, 2017

(54) VIDEO SIGNAL TRANSMISSION METHOD, DEVICE, SYSTEM AND TERMINAL

(71) Applicant: Zhejiang Dahua Technology CO., LTD, Hangzhou (CN)

(72) Inventors: Jun Yin, Hangzhou (CN); Xingming Zhang, Hangzhou (CN); Liquan Fu, Hangzhou (CN); Jiangming Zhu, Hangzhou (CN); Jun Wu, Hangzhou (CN); Jian Wu, Hangzhou (CN)

(73) Assignee: ZHEJIANG DAHUA TECHNOLOGY CO., LTD, Hangzhou (CN)

(*) Notice: Subject to any disclaimer, the term of this patent is extended or adjusted under 35 U.S.C. 154(b) by 0 days.

(21) Appl. No.: 14/391,574

(22) PCT Filed: May 16, 2013

(86) PCT No.: PCT/CN2013/075716
§ 371 (c)(1),
(2) Date: Oct. 9, 2014

(87) PCT Pub. No.: WO2013/170765
PCT Pub. Date: Nov. 21, 2013

(65) Prior Publication Data
US 2015/0070589 A1    Mar. 12, 2015

(30) Foreign Application Priority Data
May 16, 2012    (CN) .......................... 2012 1 0156042

(51) Int. Cl.
H04N 9/77 (2006.01)
H04N 11/14 (2006.01)
(Continued)

(52) U.S. Cl.
CPC ............ *H04N 11/143* (2013.01); *H01R 39/08* (2013.01); *H04N 5/23238* (2013.01);
(Continued)

(58) Field of Classification Search
CPC ............ H04N 7/52; H04N 9/78; H04N 5/232; H04N 7/18; H04N 11/04; H04N 7/173; H04N 5/225; H04N 11/143; H04N 11/00; H04N 5/23238; H04N 7/01; H04N 9/77; H01R 39/08
(Continued)

(56) References Cited

U.S. PATENT DOCUMENTS 4,720,751 A    1/1988    Peters
6,002,454 A *  12/1999   Kajiwara ............. H04N 3/2335
                                                315/368.18
(Continued)

FOREIGN PATENT DOCUMENTS

CN    1913575    2/2007
CN    101179708  5/2008
(Continued)

*Primary Examiner* — Trang U Tran
(74) *Attorney, Agent, or Firm* — Harness, Dickey & Pierce, P.L.C.

(57) ABSTRACT

The invention relates to the art of communications and particularly to a video signal transmission method, apparatus, system and terminal, where the method includes: separating a current raw digital video signal acquired by a video camera core into a luminance signal and a chrominance signal; converting the luminance signal and the chrominance signal into an analog video signal; transmitting the analog video signal to a master control chip board through an electrically-conductive slip ring; and converting the analog video signal back into the current raw digital video signal in the master control chip board. With the video signal transmission method, apparatus, system and terminal according to embodiments of the invention, the integrity of the trans-
(Continued)

mitted video signal can be improved to thereby guarantee the quality of the video signal.

7 Claims, 5 Drawing Sheets

(51) Int. Cl.
    *H04N 11/00*     (2006.01)
    *H01R 39/08*     (2006.01)
    *H04N 5/232*     (2006.01)
    *H04N 7/18*     (2006.01)
    *H04N 7/01*     (2006.01)

(52) U.S. Cl.
    CPC ............... *H04N 11/00* (2013.01); *H04N 7/01* (2013.01); *H04N 7/18* (2013.01)

(58) Field of Classification Search
    USPC .................................................. 348/663, 373
    See application file for complete search history.

(56) References Cited

U.S. PATENT DOCUMENTS

| | | | |
|---|---|---|---|
| 6,348,948 B1* | 2/2002 | Kyuma | H04N 5/23296 348/240.1 |
| 6,400,412 B1* | 6/2002 | Suzuki | H04N 9/804 348/572 |
| 6,724,423 B1* | 4/2004 | Sudo | H04N 5/232 348/188 |
| 2007/0035657 A1 | 2/2007 | Oosawa | |

FOREIGN PATENT DOCUMENTS

| | | | | |
|---|---|---|---|---|
| CN | 102014277 | | 4/2011 | |
| CN | 102186073 | | 9/2011 | |
| CN | 102724517 | | 10/2012 | |
| JP | 2011-082652 | * | 4/2011 | ............ H04N 5/222 |
| JP | 2011-82652 | | 4/2011 | |
| KR | 10-2009-0069001 | | 6/2009 | |
| KR | 10-0957843 | | 5/2010 | |

* cited by examiner

VIDEO SIGNAL TRANSMISSION METHOD, DEVICE, SYSTEM AND TERMINAL

CROSS-REFERENCE TO RELATED APPLICATIONS

This application is a US National Stage of International Application No. PCT/CN2013/075716, filed on May 16, 2013, designating the United States, and claiming the benefit of Chinese Patent Application No. 201210156042.5, filed with the Chinese Patent Office on May 16, 2012 and entitled "Video signal transmission method, apparatus, system and terminal", which is hereby incorporated by reference in its entirety.

FIELD OF THE INVENTION

The present invention relates to the field of communications and particularly to a video signal transmission method, apparatus, system and terminal.

BACKGROUND OF THE INVENTION

In the safety and guard industry, there are high requirements on a high-definition video image, and particularly the requirements on 720p, 1280p and other high-definition video formats have gradually evolved as a standard in the industry. At present a high-definition spherical video camera also has to accommodate the demand for a high-definition video. The high-definition spherical video camera is generally embodied in the form of products including a network spherical video camera and a Serial Digital Interface (SDI) spherical video camera, and in order to enable a video camera core inside the spherical video camera to be rotated horizontally over 360 degrees and vertically over 90 or 180 degrees arbitrarily, the video camera core and the master control board are connected by an electrically-conductive slip ring to thereby guarantee the reliability in electrical connection of the video camera core during rotation. At present the following two transmission schemes are generally adopted for 720p, 1280p and other high-definition video formats:

Firstly a video signal output by the video camera core is converted into a High Definition-Serial Digital Interface (HD-SDI) signal and transmitted to the control board through the electrically-conductive slip ring, but the clock frequency of the HD-SDI signal is approximately 1.485 GHz, so the digital signal at the high clock frequency can not be transmitted over a conventional electrically-conductive slip ring, therefore an expensive and process-complicated specialized electrically-conductive slip ring has to be customized, and the transmitted signal may be susceptible to interference.

Secondly the video signal output by the video camera core is converted into a multi-channel Low-Voltage Differential Signaling (LVDS) signal transmitted to the control board through the electrically-conductive slip ring by transmitting the differential signal over a plurality of channels for the purpose of sharing the amount of data. Taking five channels as an example, the signal is transmitted at the clock frequency of 27 MHz, but the frequency of the transmitted signal is still high and susceptible to interference, and there is a high requirement on the performance of the electrically-conductive slip ring. Moreover a plurality of transmission cables added as a result of a significant increase in number of channels and of an externally applied synchronization clock may also result in a significant increase in volume of the electrically-conductive slip ring and consequentially an increase in cost thereof. As a result, the structure of the spherical video camera may be restricted by the volume of the electrically-conductive slip ring and consequentially can not be minimized.

In summary, the electrically-conductive slip ring characterized by discontinuous impedance and a large number of joints thereof may impose a considerable negative influence upon the integrity, the quality of signal and other aspects of a high-frequency digital signal or an analog signal, thus degrading the accuracy of transmitted video images and consequently resulting in blocking, dithering, a frame loss and other problems of the images. Moreover the volume of the spherical video camera may be limited.

SUMMARY OF THE INVENTION

Embodiments of the invention provide a video signal transmission method, apparatus, system and terminal so as to improve the integrity of a transmitted signal and guarantee the quality of the signal.

An embodiment of the invention provides a method of transmitting a video signal, the method including:

separating a current raw digital video signal acquired by a video camera core into a luminance signal and a chrominance signal;

converting the luminance signal and the chrominance signal into an analog video signal;

transmitting the analog video signal to a master control chip board through an electrically-conductive slip ring; and converting the analog video signal back into the current raw digital video signal in the master control chip board.

Correspondingly an embodiment of the invention provides an apparatus for transmitting a video signal, the apparatus including:

a separation module configured to separate a current raw digital video signal acquired by a video camera core into a luminance signal and a chrominance signal;

a conversion module configured to convert the luminance signal and the chrominance signal into an analog video signal;

a transmission module configured to transmit the analog video signal to a master control chip board through an electrically-conductive slip ring; and a recovery module configured to convert the analog video signal back into the current raw digital video signal in the master control chip board.

Correspondingly an embodiment of the invention provides a terminal including the apparatus for transmitting a video signal described above.

Correspondingly an embodiment of the invention provides a system for transmitting a video signal, the system including a video camera core, an encoder, a digital-to-analog converter, an electrically-conductive slip ring, and an analog-to-digital converter and a decoder, both of which are disposed in a master control chip board, wherein:

the camera video core is configured to acquire a current raw digital video signal;

the encoder is configured to separate the current raw digital video signal acquired by the camera video core into a luminance signal and a chrominance signal; to convert together with the digital-to-analog converter the luminance signal and the chrominance signal into an analog video signal; and to transmit the analog video signal to the master control chip board through the electrically-conductive slip ring; and the analog-to-digital converter and the decoder disposed in the master control chip board are configured to convert the analog video signal back into the current raw digital video signal.

The embodiments of the invention provide a video signal transmission method, apparatus, system and terminal, where a current raw digital video signal acquired by a video camera core is separated into a luminance signal and a chrominance signal; the luminance signal and the chrominance signal are converted into an analog video signal; the analog video signal is transmitted to a master control chip board through an electrically-conductive slip ring; and the analog video signal is converted back into the current raw digital video signal in the master control chip board. With the video signal transmission method, apparatus, system and terminal according to the embodiments of the invention, the current raw digital video signal is separated into the luminance signal and the chrominance signal which are further encoded respectively into the analog video signal. When the analog video signal is transmitted through the electrically-conductive slip ring, the electrically-conductive slip ring is discontinuous in impedance, but its influence upon the analog video signal can be neglectable due to the low frequency of the analog video signal. Correspondingly the analog video signal is further converted by the master control chip board back into the raw digital video signal. As such the integrity of the transmitted video signal can be improved to thereby guarantee the quality of the video signal.

DETAILED DESCRIPTION OF THE EMBODIMENTS

A general implementation principle, particular implementations and corresponding advantageous effects thereof of the technical solutions according to the embodiments of the invention will be described below in details with reference to the drawings.

Figure 1:
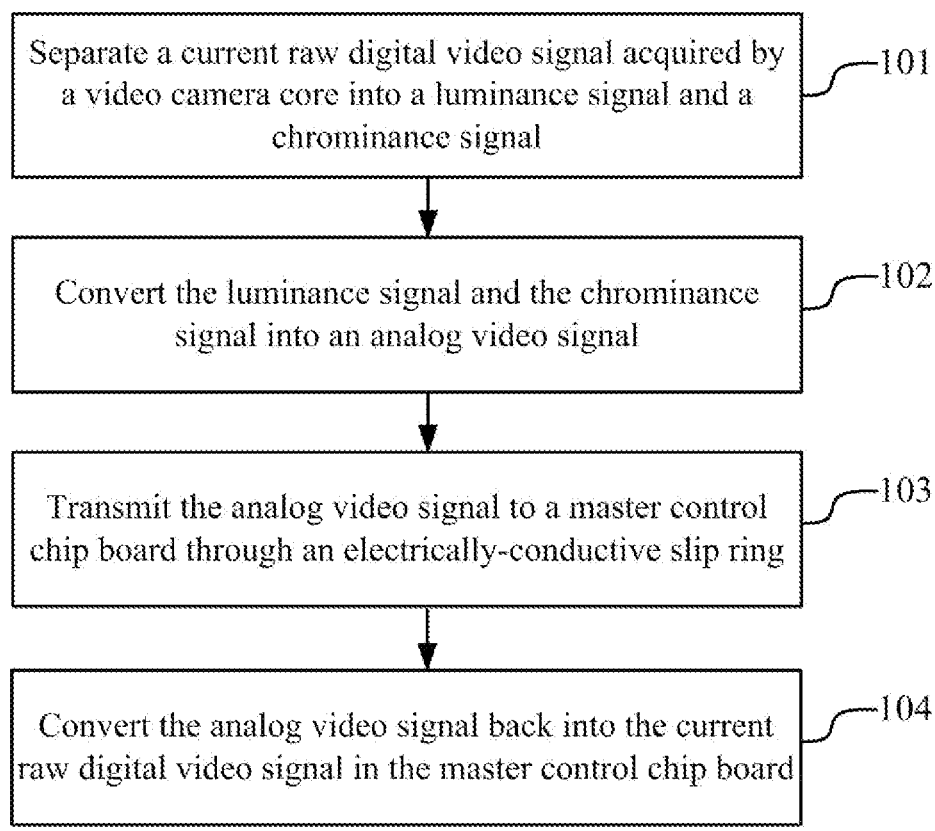
FIG. 1 is a schematic flow chart of a method of transmitting a video signal according to an embodiment of the invention.

In order to address the problems in the prior art, an embodiment of the invention provides a method of transmitting a video signal, and as illustrated in FIG. 1, the method includes:

The step 101 is to separate a current raw digital video signal acquired by a video camera core into a luminance signal and a chrominance signal;

The step 102 is to convert the luminance signal and the chrominance signal into an analog video signal;

The step 103 is to transmit the analog video signal to a master control chip board through an electrically-conductive slip ring; and The step 104 is to convert the analog video signal back into the current raw digital video signal in the master control chip board.

In view of the drawbacks of the prior art, the current raw digital video signal acquired by the video camera core is converted into the analog video signal for transmission in the method according to the embodiment of the invention, where the raw digital video signal is firstly separated into the luminance signal and the chrominance signal, and then the luminance signal and the chrominance signal are converted into the analog video signal. Particularly the luminance signal is processed by a digital filter and then baseband-encoded into a luminance-encoded digital signal; the chrominance signal is encoded over an intermediate-frequency carrier into a chrominance-encoded digital signal; and the luminance-encoded digital signal and the chrominance-encoded digital signal are superimposed into an encoded digital signal which is further digital-to-analog converted into the analog video signal. Then the analog video signal is transmitted to the master control chip board through the electrically-conductive slip ring. Correspondingly the received analog video signal is converted by the master control chip board back into the current raw digital video signal. Particularly the received analog video signal is analog-to-digital converted into the encoded digital signal; and the encoded digital signal is decoded into the current raw digital video signal.

Particularly it will be sufficient if the frequency of the analog video signal is below an upper transmission limit of an electrical signal for the electrically-conductive slip ring, and in order to lower a cost and improve the reliability in processing and transmission of the analog video signal as well as avoid wearing from occurring as a result of rotation of the electrically-conductive slip ring at a high speed for a long period of time and thus making the signal instable, the analog video signal in the embodiment of the invention can be further particularly embodied as a low-frequency analog video signal.

The luminance-encoded digital signal and the chrominance-encoded digital signal described above can be converted respectively into a first analog signal and a second analog signal, and then these two analog signals are converted respectively by the master control chip board into digital signals for further superimposition to thereby have the analog video signal converted back into the current raw digital video signal. Particularly the luminance signal is processed by the digital filter and then baseband-encoded into the luminance-encoded digital signal; the luminance-encoded digital signal is digital-to-analog converted into the first analog signal; and the chrominance signal is encoded over the intermediate-frequency carrier into the chrominance-encoded digital signal; and the chrominance-encoded digital signal is digital-to-analog converted into the second analog signal. The first analog signal and the second analog signal are respectively transmitted to the master control chip board through the electrically-conductive slip ring. Correspondingly the first analog signal is analog-to-digital converted by the master control chip board into the luminance-encoded digital signal, and the luminance-encoded digital signal is further encoded into the luminance digital signal; and the second analog signal is analog-to-digital converted into the chrominance-encoded digital signal, and the chrominance-encoded digital signal is encoded into the chrominance digital signal; and the luminance digital signal and the chrominance digital signal are superimposed and then converted into the current raw digital video signal. The received analog video signal is converted by the master control chip board back into the current raw digital video signal, and then the current raw digital video signal can be transmitted to a master processor in the master control chip board for processing.

Figure 2:
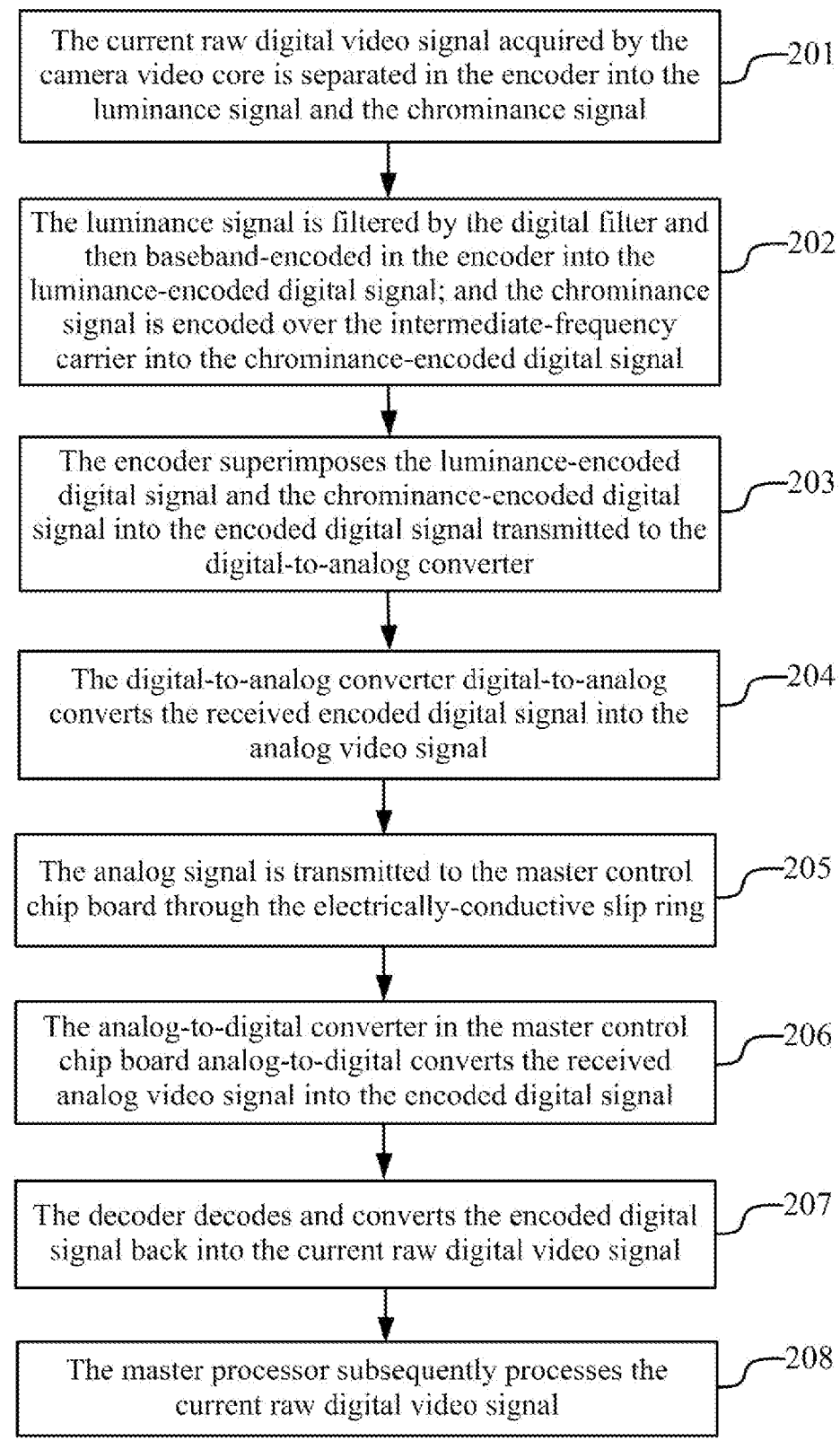
FIG. 2 is a schematic flow chart of a method of transmitting a video signal according to another embodiment of the invention.

The disclosure above will be described below in details in connection particular embodiments thereof, and as illustrated in FIG. 2, the current raw digital video signal is converted into an analog signal transmitted to the master control chip board through the electrically-conductive slip ring in the following steps:

In the step 201, the current raw digital video signal acquired by the camera video core is separated in the encoder into the luminance signal and the chrominance signal.

In the step 202, the luminance signal is filtered by the digital filter and then baseband-encoded in the encoder into the luminance-encoded digital signal; and the chrominance signal is encoded over the intermediate-frequency carrier into the chrominance-encoded digital signal;

Particularly the video camera chip in a high-definition video camera can acquire continuously a high-definition video in a digital signal pattern. Then the video camera chip outputs a 16-bit digital signal in the YCbCr format (the raw digital signal), and the encoder separates the current raw digital video signal into the luminance signal and the chrominance signal and processes these two signals through analog encoding. For example, the luminance signal is processed by the digital filter and then baseband-encoded into the luminance-encoded digital signal; and the chrominance signal is encoded over the intermediate-frequency carrier into the chrominance-encoded digital signal, where for 25-frame and 30-frame high-definition videos in the 720P format, the luminance signal is filtered by the 15 MHz digital filter and encoded over the 18 MHz intermediate-frequency carrier as per the horizontal resolution thereof into the analog video signal; and for 25-frame and 30-frame high-definition videos in the 1080P format and 50-frame and 60-frame high-definition videos in the 720P format, the luminance signal is filtered by the 30 MHz digital filter and encoded over the 36 MHz intermediate-frequency carrier as per the horizontal resolution thereof into the analog video signal.

In the step 203, the encoder superimposes the luminance-encoded digital signal and the chrominance-encoded digital signal into the encoded digital signal transmitted to the digital-to-analog converter; and particularly the encoder superimposes the luminance-encoded digital signal and the chrominance-encoded digital signal of the current raw digital video signal into the encoded digital signal.

In the step 204, the digital-to-analog converter digital-to-analog converts the received encoded digital signal into the analog video signal; and particularly if the 15 MHz digital filter and encoding over the 18 MHz intermediate-frequency carrier is selected in the step 202, then the analog video signal output by the digital-to-analog converter as a result of conversion can be up to 20 MHz. Moreover the frequency of the analog video signal can be controlled by selecting the digital-to-analog converter varying in precision.

In the step 205, the analog signal is transmitted to the master control chip board through the electrically-conductive slip ring; and particularly an influence of the impedance of the electrically-conductive slip ring upon the analog video signal transmitted through the electrically-conductive slip ring may ideally be neglectable due to the low frequency of the analog video signal.

In the step 206, the analog-to-digital converter in the master control chip board analog-to-digital converts the received analog video signal into the encoded digital signal; and the encoded digital signal here is the same as the encoded digital signal formed in the step 203. Preferably the analog-to-digital converter has the same precision as the digital-to-analog converter described above to thereby further ensure the encoded digital signal prior to digital-to-analog conversion to be the same as the encoded digital signal as a result of analog-to-digital conversion.

In the step 207, the decoder decodes and converts the encoded digital signal to back into the current raw digital video signal described above.

In the step 208, the master processor subsequently processes the current raw digital video signal.

Figure 3:
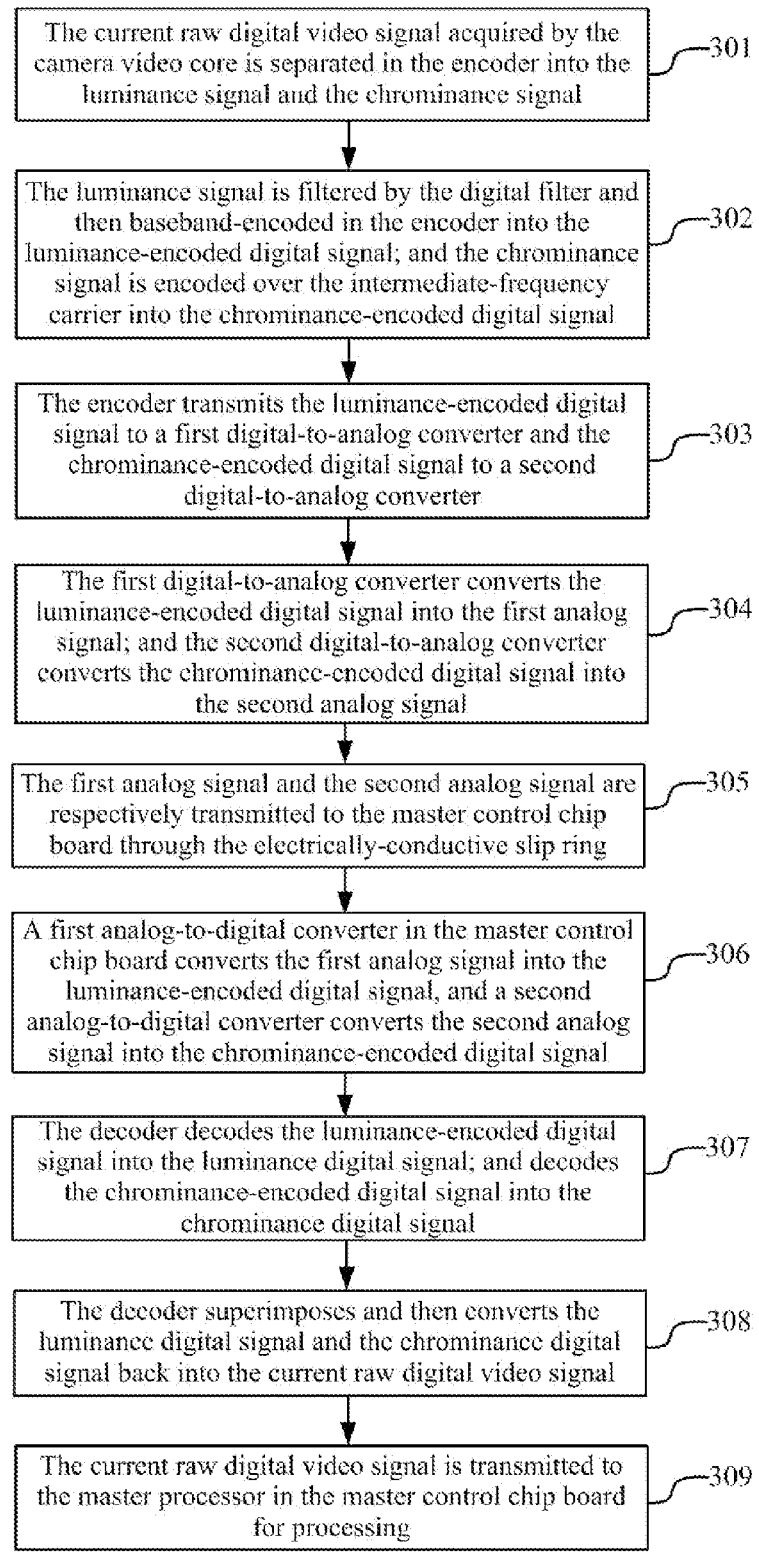
FIG. 3 is a schematic flow chart of a method of transmitting a video signal according to still another embodiment of the invention.

As illustrated in FIG. 3, the raw digital video signal is converted into two analog video signals transmitted to the master control chip board through the electrically-conductive slip ring in the following steps:

In the step 301, the current raw digital video signal acquired by the camera video core is separated in the encoder into the luminance signal and the chrominance signal.

In the step 302, the luminance signal is filtered by the digital filter and then baseband-encoded in the encoder into the luminance-encoded digital signal; and the chrominance signal is encoded over the intermediate-frequency carrier into the chrominance-encoded digital signal;

Particularly the video camera chip in a high-definition video camera can acquire continuously a high-definition video in a digital signal pattern. Then the video camera chip outputs a 16-bit digital signal in the YCbCr format (the raw digital signal), and the encoder separates the current raw digital video signal into the luminance signal and the chrominance signal and processes these two signals through analog encoding. For example, the luminance signal is processed by the digital filter and then baseband-encoded into the luminance-encoded digital signal; and the chrominance signal is encoded over the intermediate-frequency carrier into the chrominance-encoded digital signal, where for 25-frame and 30-frame high-definition videos in the 720P format, the luminance signal is filtered by the 15 MHz digital filter and encoded over the 18 MHz intermediate-frequency carrier as per the horizontal resolution thereof into the analog video signal; and for 25-frame and 30-frame high-definition videos in the 1080P format and 50-frame and 60-frame high-definition videos in the 720P format, the luminance signal is filtered by the 30 MHz digital filter and encoded over the 36 MHz intermediate-frequency carrier as per the horizontal resolution thereof into the analog video signal.

In the step 303, the encoder transmits the luminance-encoded digital signal to a first digital-to-analog converter and the chrominance-encoded digital signal to a second digital-to-analog converter.

In the step 304, the first digital-to-analog converter converts the luminance-encoded digital signal into the first analog signal; and the second digital-to-analog converter converts the chrominance-encoded digital signal into the second analog signal.

In the step 305, the first analog signal and the second analog signal are respectively transmitted to the master control chip board through the electrically-conductive slip ring.

In the step 306, a first analog-to-digital converter in the master control chip board converts the first analog signal into the luminance-encoded digital signal, and a second analog-to-digital converter converts the second analog signal into the chrominance-encoded digital signal.

In the step 307, the decoder decodes the luminance-encoded digital signal into the luminance digital signal; and decodes the chrominance-encoded digital signal into the chrominance digital signal.

In the step 308, the decoder superimposes and then converts the luminance digital signal and the chrominance digital signal back into the current raw digital video signal.

In the step 309, the current raw digital video signal is transmitted to the master processor in the master control chip board for processing.

As can be apparent from the description above, with the method of transmitting a video signal according to the embodiment of the invention, the current raw digital video signal is separated into the luminance signal and the chrominance signal which are further encoded respectively into the analog video signal, and when the analog video signal is transmitted through the electrically-conductive slip ring, the electrically-conductive slip ring is discontinuous in impedance, but its influence upon the analog video signal can be neglectable due to the low frequency of the analog video signal. Correspondingly the analog video signal is further converted by the master control chip board back into the raw digital video signal. As such the integrity of the transmitted video signal can be improved to thereby guarantee the quality of the video signal.

Figure 4:
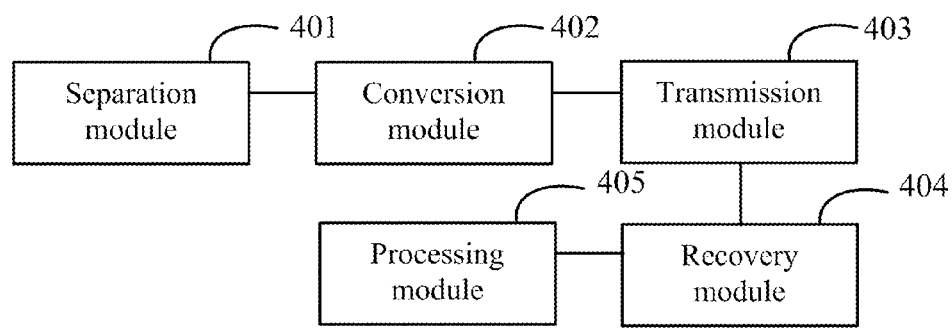
FIG. 4 is a schematic diagram of an apparatus for transmitting a video signal according to an embodiment of the invention.

Based upon the same inventive idea, an embodiment of the invention further provides an apparatus for transmitting a video signal, and as illustrated in FIG. 4, the apparatus includes:

A separation module 401 is configured to separate a current raw digital video signal acquired by a video camera core into a luminance signal and a chrominance signal;

A conversion module 402 is configured to convert the luminance signal and the chrominance signal into an analog video signal;

A transmission module 403 is configured to transmit the analog video signal to a master control chip board through an electrically-conductive slip ring; and A recovery module 404 is configured to convert the analog video signal back into the current raw digital video signal in the master control chip board.

In order to lower a cost and improve the reliability in processing and transmission of the analog video signal as well as avoid wearing from occurring as a result of rotation of the electrically-conductive slip ring at a high speed for a long period of time and thus making the signal instable, the analog video signal can be further particularly embodied as a low-frequency analog video signal.

Preferably the conversion module 402 is further configured to process the luminance signal by a digital filter and then to baseband-encode it into a luminance-encoded digital signal; to encode the chrominance signal over an intermediate-frequency carrier into a chrominance-encoded digital signal; and to superimpose the luminance-encoded digital signal and the chrominance-encoded digital signal into an encoded digital signal and then convert the encoded digital signal into the analog video signal by a digital-to-analog converter. Preferably the recovery module 404 is further configured to analog-to-digital convert the received analog video signal into the encoded digital signal; and to decode the encoded digital signal back into the current raw digital video signal.

Preferably the conversion module 402 is further configured to process the luminance signal by a digital filter and then to baseband-encode it into a luminance-encoded digital signal, and to convert the luminance-encoded digital signal into a first analog signal by a digital-to-analog converter; and to encode the chrominance signal over an intermediate-frequency carrier into a chrominance-encoded digital signal, and to convert the chrominance-encoded digital signal into a second analog signal by a digital-to-analog converter. Preferably the recovery module 404 is further configured to analog-to-digital convert the first analog signal into the luminance-encoded digital signal and to decode the luminance-encoded digital signal into the luminance digital signal; to analog-to-digital convert the second analog signal into the chrominance-encoded digital signal and to decode the chrominance-encoded digital signal into the chrominance digital signal; and to superimpose and then convert the luminance digital signal and the chrominance digital signal back into the current raw digital video signal.

Preferably the apparatus further includes:

A processing module 405 is configured to transmit the current raw digital video signal to a master processor in the master control chip board for processing after the recovery module 404 converts the analog video signal back into the current raw digital video signal.

Based upon the same inventive idea, an embodiment of the invention provides a terminal including the apparatus for transmitting a video signal described above.

As can be apparent from the description above, with the apparatus for transmitting a video signal according to the embodiment of the invention, the current raw digital video signal is separated into the luminance signal and the chrominance signal which are further encoded respectively into the analog video signal. When the analog video signal is transmitted through the electrically-conductive slip ring, the electrically-conductive slip ring is discontinuous in impedance, but its influence upon the analog video signal can be neglectable due to the low frequency of the analog video signal. Correspondingly the analog video signal is further converted by the master control chip board back into the raw digital video signal. As such the integrity of the transmitted video signal can be improved to thereby guarantee the quality of the video signal.

Figure 5:
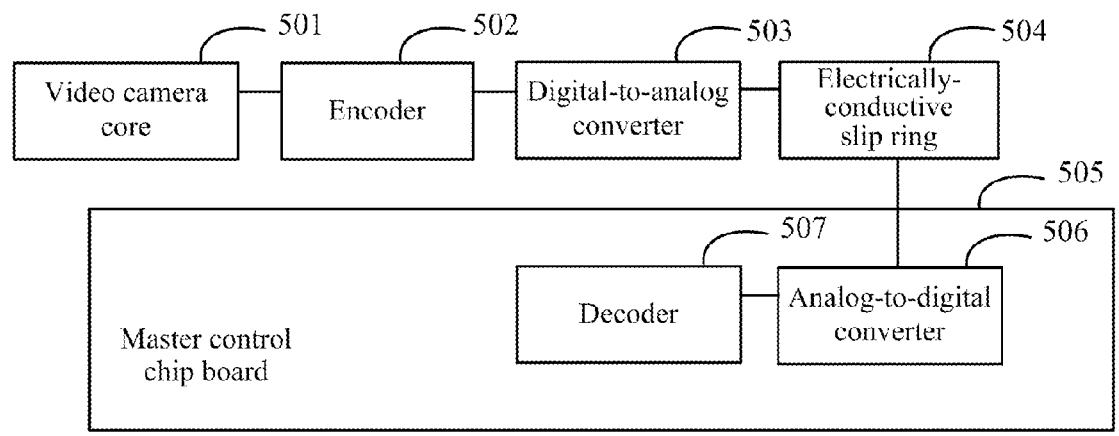
FIG. 5 is a schematic diagram of a system for transmitting a video signal according to an embodiment of the invention.

Based upon the same inventive idea, an embodiment of the invention provides a system for transmitting a video signal, and as illustrated in FIG. 5, the system includes: a camera video core 501, an encoder 502, a digital-to-analog converter 503, an electrically-conductive slip ring 504, and an analog-to-digital converter 506 and a decoder 507 disposed in a master control chip board 505;

The camera video core 501 is configured to acquire a current raw digital video signal;

The encoder 502 is configured to separate the current raw digital video signal acquired by the camera video core 501 into a luminance signal and a chrominance signal; to convert together with the digital-to-analog converter the luminance signal and the chrominance signal into an analog video signal; and to transmit the analog video signal to the master control chip board 505 through the electrically-conductive slip ring 504; and The analog-to-digital converter 506 and the decoder 507 disposed in the master control chip board 505 are configured to convert the analog video signal back into the current raw digital video signal.

Moreover, in order to lower a cost and improve the reliability in processing and transmission of the analog video signal as well as avoid wearing from occurring as a result of rotation of the electrically-conductive slip ring at a high speed for a long period of time and thus making the signal instable, the analog video signal can be further particularly embodied as a low-frequency analog video signal.

Preferably when the number of digital-to-analog converters 503 is one, the encoder 502 is configured to process the luminance signal by a digital filter and then to baseband-encode it into a luminance-encoded digital signal; to encode the chrominance signal over an intermediate-frequency carrier into a chrominance-encoded digital signal; and to superimpose the luminance-encoded digital signal and the chrominance-encoded digital signal into an encoded digital signal; and the digital-to-analog converter 503 is configured to convert the encoded digital signal into the analog video signal.

Figure 6:
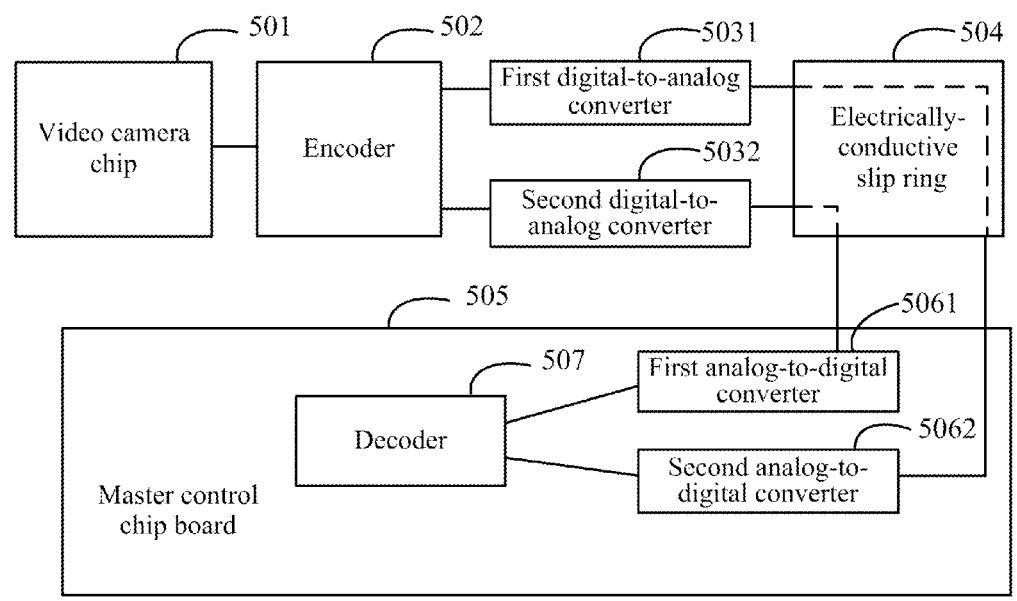
FIG. 6 is a schematic diagram of a system for transmitting a video signal according to another embodiment of the invention.

As illustrated in FIG. 6, based upon FIG. 5, when the number of digital-to-analog converters is two, the encoder is configured to process the luminance signal by a digital filter and then to baseband-encode it into a luminance-encoded digital signal, and to convert the luminance-encoded digital signal into a first analog signal by a first digital-to-analog converter 5031; and to encode the chrominance signal over an intermediate-frequency carrier into a chrominance-encoded digital signal, and to convert the chrominance-encoded digital signal 5032 into a second analog signal by a second digital-to-analog converter.

Preferably as illustrated in FIG. 5, the number of analog-to-digital converters 506 is the same as the number of digital-to-analog converters 503, and when the number of digital-to-analog converters 503 is one, and the number of analog-to-digital converters 506 is one, the analog-to-digital converter 506 is configured to convert the received analog video signal into the encoded digital signal; and the decoder 507 is configured to decode and convert the encoded digital signal back into the current raw digital video signal; and As illustrated in FIG. 6, when the number of digital-to-analog converters is two, and the number of analog-to-digital converters is two, a first analog-to-digital converter 5061 is configured to analog-to-digital convert the first analog signal into the luminance-encoded digital signal; and a second analog-to-digital converter 5062 is configured to analog-to-digital convert the second analog signal into the chrominance-encoded digital signal; and the decoder 507 is configured to decode the luminance-encoded digital signal into the luminance digital signal; to decode the chrominance-encoded digital signal into the chrominance digital signal; and to superimpose and then convert the luminance digital signal and the chrominance digital signal back into the current raw digital video signal.

Preferably the system further includes:

A master processor is configured to transmit the current raw digital video signal to a master processor in the master control chip board for processing after converting back into the current raw digital video signal.

As can be apparent from the description above, with the video signal transmission method, apparatus, system and terminal according to the embodiments of the invention, the current raw digital video signal is separated into the luminance signal and the chrominance signal which are further encoded respectively into the analog video signal. When the analog video signal is transmitted through the electrically-conductive slip ring, the electrically-conductive slip ring is discontinuous in impedance, but its influence upon the analog video signal can be neglectable due to the low frequency of the analog video signal. Correspondingly the analog video signal is further converted by the master control chip board back into the raw digital video signal. As such the integrity of the transmitted video signal can be improved to thereby guarantee the quality of the video signal.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide the steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of transmitting a video signal, comprising:
   separating a current raw digital video signal acquired by a video camera core into a luminance signal and a chrominance signal, the current raw digital video signal having a 720P format or a 1080P format;

when the current raw digital video signal is a 25-frame or 30-frame high-definition digital video signal in 720P format, filtering the luminance signal by a 15 MHz digital filter, encoding the filtered luminance signal by an 18 MHz intermediate-frequency carrier into a luminance-encoded digital signal and encoding the chrominance signal by the 18 MHz intermediate-frequency carrier or another intermediate-frequency carrier into a chrominance-encoded digital signal;

when the current raw digital video signal is a 25-frame or 30-frame high-definition digital video signal in 1080P format or a 50-frame or 60-frame high-definition digital video signal in 720P format, filtering the luminance signal by a 30 MHz digital filter, encoding the filtered luminance signal by a 36 MHz intermediate-frequency carrier into a luminance-encoded digital signal and encoding the chrominance signal by the 36 MHz intermediate-frequency carrier or another intermediate-frequency carrier into a chrominance-encoded digital signal;

converting the luminance-encoded digital signal and the chrominance-encoded digital signal into an analog video signal having a frequency of less than or equal to 20 MHz;

transmitting the analog video signal to a master control chip board through an electrically-conductive slip ring; and converting the analog video signal back into the current raw digital video signal in the 720P format or the 1080P format in the master control chip board.

2. The method according to claim 1, wherein the analog video signal is a low-frequency analog video signal.

3. The method according to claim 2, wherein:

converting the luminance-encoded digital signal and the chrominance-encoded digital signal comprises superimposing the luminance-encoded digital signal and the chrominance-encoded digital signal into an encoded digital signal and then converting the encoded digital signal into the analog video signal having a frequency of less than or equal to 20 MHz.

4. The method according to claim 3, wherein converting the analog video signal back into the current raw digital video signal in the master control chip board comprises:

analog-to-digital converting the received analog video signal into the encoded digital signal; and decoding the encoded digital signal back into the current raw digital video signal.

5. The method according to claim 2, wherein converting the luminance signal and the chrominance signal into the analog video signal comprises:

processing the luminance signal by a digital filter and then baseband-encoding it into a luminance-encoded digital signal, and digital-to-analog converting the luminance-encoded digital signal into a first analog signal; and encoding the chrominance signal over an intermediate-frequency carrier into a chrominance-encoded digital signal, and digital-to-analog converting the chrominance-encoded digital signal into a second analog signal.

6. The method according to claim 5, wherein converting the analog video signal back into the current raw digital video signal in the master control chip board comprises:

analog-to-digital converting the first analog signal into the luminance-encoded digital signal and decoding the luminance-encoded digital signal into the luminance digital signal;

analog-to-digital converting the second analog signal into the chrominance-encoded digital signal and decoding the chrominance-encoded digital signal into the chrominance digital signal; and superimposing and then converting the luminance digital signal and the chrominance digital signal back into the current raw digital video signal.

7. The method according to claim 2, wherein after the analog video signal is converted back into the current raw digital video signal in the master control chip board, the method further comprises:

transmitting the current raw digital video signal to a master processor in the master control chip board for processing.

* * * * *